(12) United States Patent  
Gerber

(10) Patent No.: US 7,528,504 B2  
(45) Date of Patent: May 5, 2009

(54) AUTOMATIC POWER ADAPTER

(76) Inventor: Lewis Gerber, 4921 SW. 33rd Ter., Fort Lauderdale, FL (US) 33312

( * ) Notice: Subject to any disclaimer, the term of this patent is extended or adjusted under 35 U.S.C. 154(b) by 0 days.

(21) Appl. No.: 11/870,880

(22) Filed: Oct. 11, 2007

(65) Prior Publication Data

US 2008/0025058 A1 Jan. 31, 2008

Related U.S. Application Data

(63) Continuation of application No. 11/132,122, filed on May 17, 2005, now abandoned.

(60) Provisional application No. 60/644,872, filed on Jan. 18, 2005.

(51) Int. Cl.
*H02J 3/00* (2006.01)
*H02K 3/38* (2006.01)

(52) U.S. Cl. ............................. 307/71; 307/72; 307/85; 307/86; 307/87

(58) Field of Classification Search ................. None
See application file for complete search history.

(56) References Cited

U.S. PATENT DOCUMENTS

| | | | | |
|---|---|---|---|---|
| 3,582,669 A | * | 6/1971 | Dempsey | 307/18 |
| 3,588,519 A | * | 6/1971 | Luebrecht | 307/87 |
| 3,991,320 A | * | 11/1976 | Ross | 307/71 |
| 4,159,503 A | * | 6/1979 | Ross | 361/187 |
| 4,204,243 A | | 5/1980 | Ross | |
| 4,754,161 A | * | 6/1988 | Fox | 307/87 |
| 4,797,570 A | * | 1/1989 | Fox | 307/87 |
| 4,937,463 A | * | 6/1990 | Kobayashi et al. | 307/87 |
| 5,160,852 A | | 11/1992 | Charles et al. | |
| 5,245,219 A | | 9/1993 | Romatzick, Jr. et al. | |
| 5,302,857 A | | 4/1994 | Charles et al. | |
| 7,408,273 B2 | * | 8/2008 | Slocum | 307/80 |

* cited by examiner

*Primary Examiner*—Stephen W Jackson
*Assistant Examiner*—Adi Amrany
(74) *Attorney, Agent, or Firm*—Malin Haley DiMaggio Bowen & Lhota, P.A.

(57) ABSTRACT

An electrical device for automatically combining two input power source supply circuits with either aligned or unaligned phases, into a single operational circuit, with an output load capacity totaling approximately the sum of the two lower capacity power supply circuits. The device and adapters, through a series of coupled relays and contactors, incorporates internal circuitry and components which sense the phase relationship and alignment of the supply circuits, and depending upon conditions chooses the correct path, and automatically connects the supply circuits to the load circuit without the need of manual switches, or additional adapters.

13 Claims, 6 Drawing Sheets

AUTOMATIC POWER ADAPTER

CROSS-REFERENCES TO RELATED APPLICATIONS

This continuation patent application claims priority of and from Provisional Patent Application Ser. No. 60/644,872 filed Jan. 18, 2005, and Utility patent application Ser. No. 11/132,122 filed on May 17, 2005.

STATEMENT REGARDING FEDERALLY SPONSORED RESEARCH

Not Applicable.

PARTIES TO A JOINT RESEARCH AGREEMENT

Not Applicable.

BACKGROUND OF THE INVENTIONS

1. Field of Invention

This invention relates to electrical power adapters, and more particularly to an automatic polymer adapter for supplying electrical power to a marine vessel or vehicle load from a pair of combined lower amperage capacity sources. The power sources can be selectively and automatically electrically connected and applied to the load to increase the current capacity depending on the sensed configuration and phase alignment of the input power sources.

2. Description of the Prior Art

The prior art addresses the application of land or dock electrical power sources to marine vessels. When marine craft are moored alongside a dock or seawall electrical power is usually, supplied from shore side power sources that may have circuits with lower amperage capacities than the craft requires. It is common practice to use adapters of various types to collect two lower amperage circuits into one higher amperage circuit. The most basic type of adapters have no safety provisions, such as protecting the exposed blades of an unattached plug which can cause dangerous shocks and burns, or protection against incorrect phase matching of the shore side power connections, which can result in shorts, blown fuses and/or tripped circuit breakers. Some phase-sensing units do have the capabilities to avoid the potential safe hazards and shorts, but if the phases are not aligned properly at the shore-side power supplies the units will not be enabled and will not allow power to pass through or be supplied to the craft without the requirement of additional adapters, or alternatively rewiring the shore-side power supplies. Some existing phase-sensing units may have capabilities to switch the phases manually, but not automatically through circuitry set forth in the instant inventions.

For example, U.S. Pat. No. 4,204,243 issued to Ross is entitled "Polarity Indicating and Reversing Unit", and discloses an adapter device which senses and indicates a reverse polarity condition for internal wiring at a power supply or load, such as an appliance, tool, mobile home, trailer or extension cord. The device is also used to connect two two-wire plus ground power supply lines each having a neutral and a hot, inlet conductor to a single three-wire plus ground load line having a common neutral and two hot outlet conductors. However, once an undesired polarity condition is detected, an operator must utilize one of two manual switches to reverse the polarity of either of the inlet lines to a common outlet line. The unit also has an automatic disconnect feature to electrically disconnect either of the inlet plugs from the unit when a power supply line is not connected to that inlet plug, but will allow operation when one plug is connected.

U.S. Pat. No. 5,160,852 issued to Charles et al. is entitled "Power Adapter", and teaches a circuit design used to connect a marine vessel or other mobile electrical load to stationary power sources including those provided on power supply pedestals in marinas. This adapter is used to connect a pair of 120 volt sources to a higher voltage load, such as a 240 volt load used on many boats. This design includes an isolation circuit to avoid electrical shock, and a pair of diode bridge networks. A sensing means within this adapter determines if the power sources are in proper relationship, such as out-of-phase 120 volt supplies for summing voltage or in phase supplies for summing current. If the predetermined proper relationship is established, an output means is driven and enabled for electrical connection to the load. However, if a proper relationship in not determined, the adapter is disabled, and no output is generated to the load. Indicator lights are used to indicate a fault condition to the user, as well as the nature of the problem. The adapter does not correct or compensate for improper phase relationships, and simply prevents operation of the unit. The user is left to correct the problems through rewiring of sources, use of additional adapters or the like.

U.S. Pat. No. 5,245 219 issued to Romatzick, Jr. et al is entitled "Marine Power Y-Adapter", and discloses a Y adapter for interfacing with a dockside power center having two conventional receptacles and having two three-pole plugs and a third four-pole plug for connecting to the load/marine vessel, the latter being phase conductors L1 and L2 along with neutral and ground conductors. This device is disabled if one dockside male plug is not inserted into a receptacle or is removed. The Y adapter also supplies voltage equal to the sum of the input voltages to the vessel when the sensor and control means is responsive to a pre-determined difference in voltage between phase conductors. If the phases or polarities sensed are not proper, or if there is an improper wiring condition at the dockside receptacles, the adapter indicates a fault condition and does not pass voltage to the output connector or marine vessel. Although the user is alerted to the incompatible conditions and lack of power to the vessel, the Y adapter does not correct or compensate for the problems or improper wiring. Re-wiring or the use of separate equipment is required.

Lastly, U.S. Pat. No. 5,302,857 is to Charles et al., is entitled "Portable Power Adapter", and depicts circuit designs for connecting a 240 volt load/marine vessel to a pair of 120 volt sources such as those provided in marinas. The circuitry includes isolation means for isolating the input connectors from one another during connection operation, sensing means for determining that the sources are in proper phase relationship, and summing means for providing the multiple power inputs to a driven load. The adapter disclosed protects the operator and advises as to the operability and status of the adapter and connections when predetermined conditions are satisfied If conditions are not met, indicating improper phase relationships, voltages, polarity, tripped breakers or the like the adapter indicates it's inoperative and fault detection status. In this mode, power is not supplied to the output of the adapters or to the marine vessel. Although the nature of the problem is indicated in part as with other prior art devices, this adapter and circuitry does not contain any internal components capable of automatically correcting, the problems, compensating for phase relationships or mis-wiring, aid summing the amperage in a desired fashion to remain operable and power the craft.

The automatic power adapter of the instant invention has protective features to safely avoid shocks and burns, to sense the alignment of all phases, and to automatically and internally align the phases if necessary, and connect the circuits correctly without any additional switches or adapters.

It is therefore an object and feature of the instant inventions to provide a power adapter which can pass through independent voltage and current input sources, automatically detecting and compensating for any necessary, phase alignments, and summing the amperage available for output to a load or marine vessel.

It is further an object and feature of the instant inventions to provide an automatic power adapter which is responsive to a variety of different wiring phase, voltage, polarity or circuit breaker conditions of two input power sources, automatically, compensate and take corrective actions to maintain proper voltage and sum current capacity, and provide a single desired output without any actions required on the part of an operator or user.

It is further an object and feature of the instant inventions to provide a heavy duty automatic power adapter for large load maine vessels which incorporates inherent safety features, provides status indicators eliminates the need for auxiliary equipment or adapters, and is cost effective to manufacture and is operationally efficient.

Finally, it is desirable to provide and automatic power adapter having all of the objects and features mentioned above.

SUMMARY OF THE INVENTION

The instant inventions automatically and safely adapt two lower amperage capacity circuits into a single higher amperage capacity circuit, equaling the approximate sum of the two amperage circuits. For example, a particular application is to use the automatic adapter to electrically connect power from a shoreline power source having two separate 240 volt, 50 amp circuits to supply power to a marine vessel having a 240 volt, 100 amp circuit or load capacity. The instant adapter provides such a single output and connector. This device is able to automatically adapt the two lower amperage capacity circuits into a high amperage circuit without any additional adapters, whether or not the phases of the power source lower amperage circuits are aligned or in proper phase relationship. The use of the instant automatic adapter is seamless and requires no extraneous actions by the operator, and similarly does not require any re-wiring or auxiliary equipment. The internal circuitry literally "adapts" to the multiple and different sensed input configurations, voltages, AC electrical connections aid receptacles of the input power supplies, enables discrete internal circuit within the adapter and supplies a single, passed through 240 volt, 100 amp output to the load.

The automatic adapter constitutes a substantial advance over the prior art and conventional devices which will sense the phase relationships of power sources and voltage lines but will only connect the circuits if the phases are properly aligned based on predetermined conditions. However if the phases are not aligned the devices are inoperable, indicate a failure or disabled circuitry connection status, and will not be able to be utilized without additional adapters or re-wiring of the power sources.

The instant inventions may be best understood, and objects and advantages will become apparent from the following detailed descriptions when taken in conjunction with, and by reference to, the drawings in which:

DETAILED DESCRIPTION OF PREFERRED EMBODIMENTS

Figure 1:
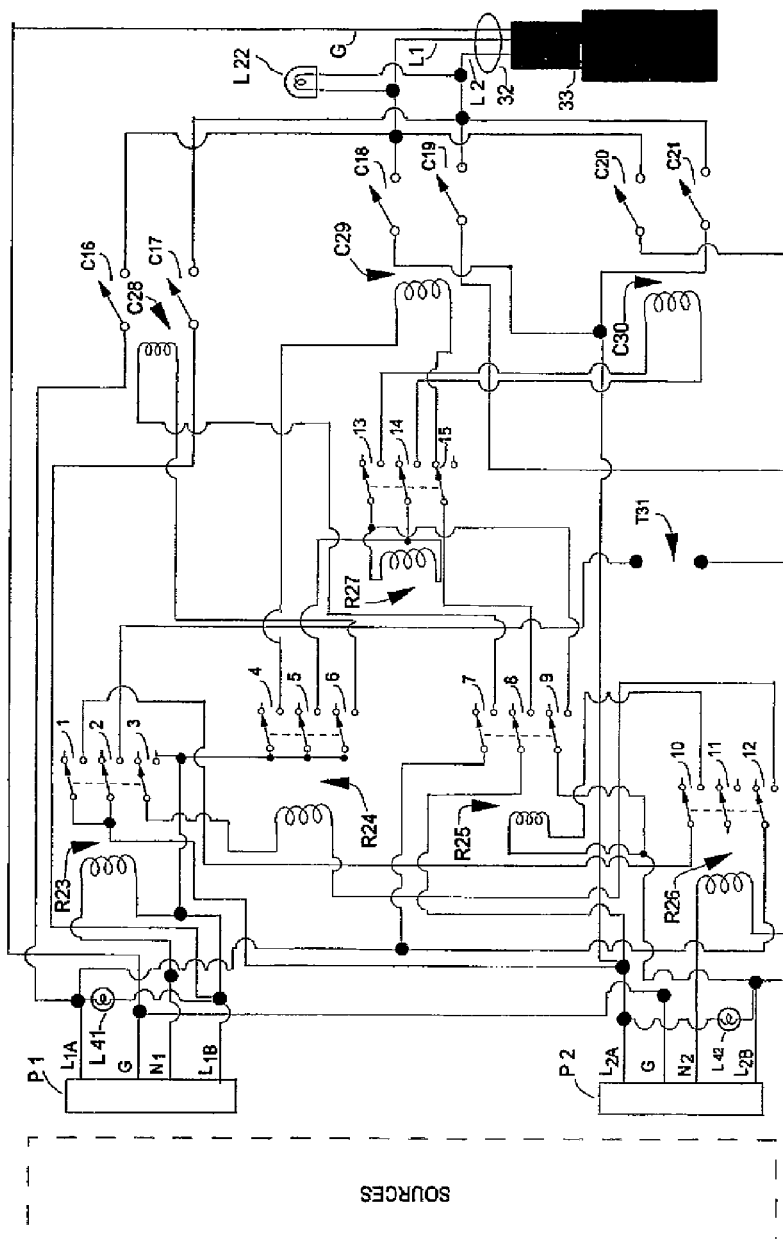
FIG. 1 is a schematic diagram of the circuitry of a preferred embodiment of the automatic power adapter and its internal electrical components.

With reference to FIG. 1 the drawings, a preferred embodiment of an automatic power adapter is illustrated, along with a configuration for the electrical circuitry and internal components. The adapter is used to connect and interface conventional shore-side power sources provided by marinas to marine vessels. As described above, pedestal dock power sources typically can include two 240 volt, 50 amp female receptacles. Larger boats or yachts are configured to accept or require a 240 volt input, however having a load circuit capacity, or requirement of 100 amps. The automatic adapter fulfills this need through the circuitry, plugs P1 and P2, and single output receptacle 33 as depicted.

In one embodiment, the main components consist of, but are not limited to, adapter plugs P1 and P2 which are inserted into complementary power source receptacles. Both P1 and P2 have separate male prongs or blades wired to and enabling hot voltages lines (L1A and L1B of P1, L2A and L2B of P2), a neutral line (N1 and N2), and a ground line (G1 and G2) of the independent plugs, respectively. Plugs P1 and P2 are electrically connected through circuit lines and nodes to a network of relays. The relays can be electro-mechanical devices having voltage and current sensors and internal coils which enable single or double throw, multiple pole switches.

The relay network is shown in this embodiment to include five relays R23, R24, R25, R26, and R27. The plurality of relays in turn is coupled to and controls a network of contactors which ultimately provide power, voltage and current to output receptacle 33.

In a preferred embodiment, the circuitry includes three two or three pole contactors C28, C29, and C30, the operation of which is further described hereinafter. A timer T31 can also be utilized to delay a power connection in a desired fashion. Indicator light means L41, L42 and L22 can be incorporated into the circuitry to provide visual status of circuit enablement or operation.

As an additional safety measure, contactors C29 and C30 can be equipped with a mechanical lockout or normally closed auxiliary contactor switches to eliminate the possibility of both contactors activating, at the same time.

Figure 2:
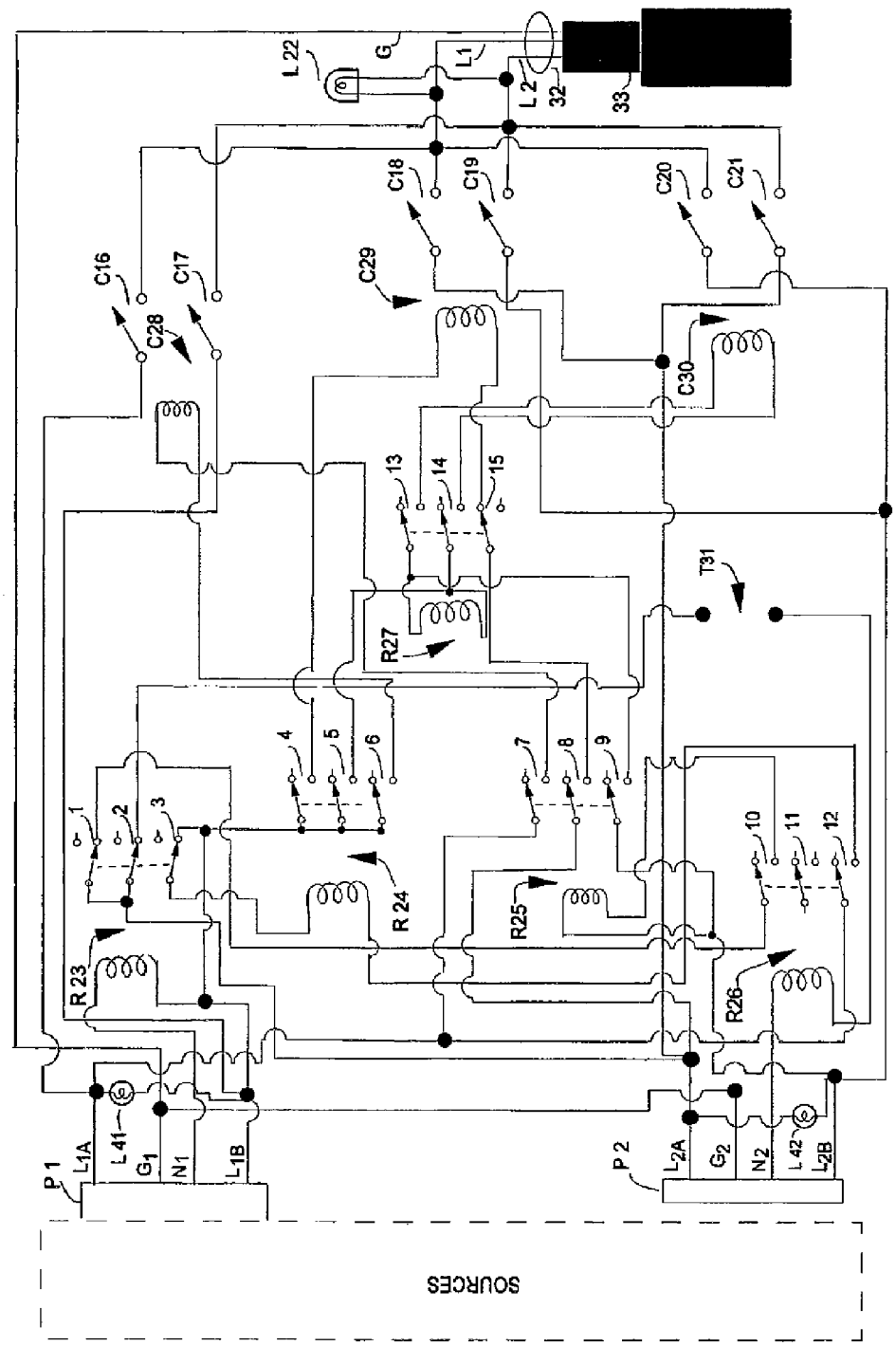
FIG. 2 is a schematic diagram of the circuitry of a preferred embodiment of the automatic power adapter and its internal electrical components, therein only Plug No.1 (P1) is inserted into a power source.

FIG. 2 of the drawings illustrates the configuration wherein only plug P1 is inserted into a shore-side power source. When P1 is inserted into a matching receptacle or connector with two opposite pole 110-120 volt AC live lines, a neutral line, and a ground line, power will flow from line 1B to the coil of relay R23 to the neutral line N1 of plug P1, completing the 110-120 volt circuit, activating the relay, closing the R23 normally open contacts 1, 2 and 3. Power will flow from line L1A and from line L1B, to indicator means L41 to illuminate the 240 volt lamp L41. No further actions or enablement of other circuit components will take place unless plug P2 is inserted into a matching power source receptacle or connector. Until that time, the plug P2 will not have any voltage or current applied to any blades, thereby preventing, and avoiding, the possibility of a user incurring electrical shocks or burns.

Figure 3:
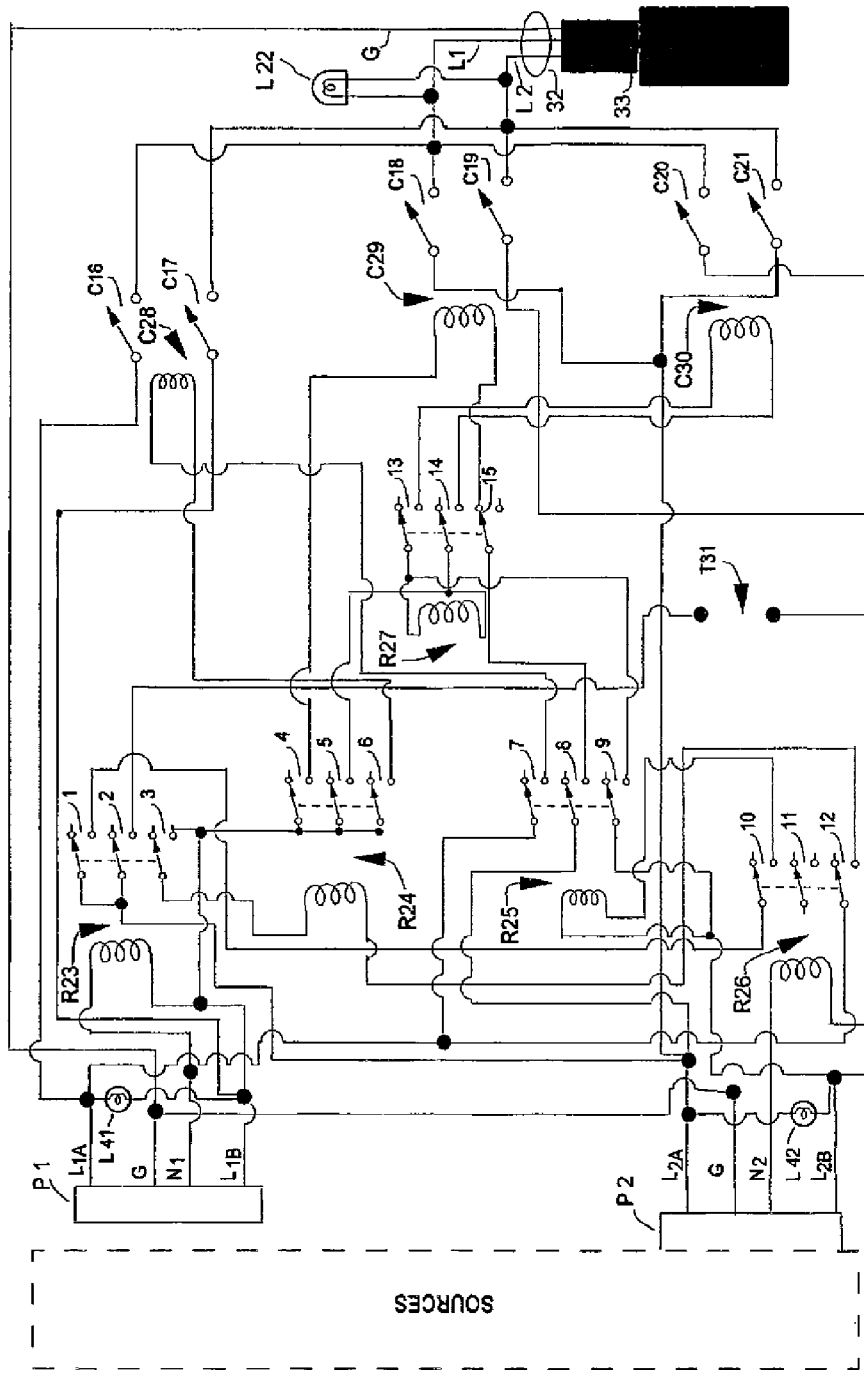
FIG. 3 is a schematic diagram of the circuitry of a preferred embodiment of the automatic power adapter and its internal electrical components, wherein only Plug No.2 (P2) is inserted into a power source.

FIG. 3 of the drawings illustrates the configuration wherein only plug P2 is inserted into a shore-side power source. When P2 is inserted into a matching receptacle or connector with two opposite pole 110-121 volt AC live lines, a neutral line, and a ground line, power will flow from line L2A, and from line L2 to indicator means L42 to illuminate the 240 volt lamp L42. There will be no further actions or enablement of other circuit components until such time that plug P1 is inserted into a power source as further described hereinafter. Also note that in this configuration a lead of the timer T31 is wired to open contact 2 of relay R23 which therefore will not be activated until plug P1 is inserted into a live source receptacle or connector. As no power is applied, P1 has no voltage or current applied to any blades, likewise avoiding the possibility of a user being inadvertently shocked or burned.

Figure 4:
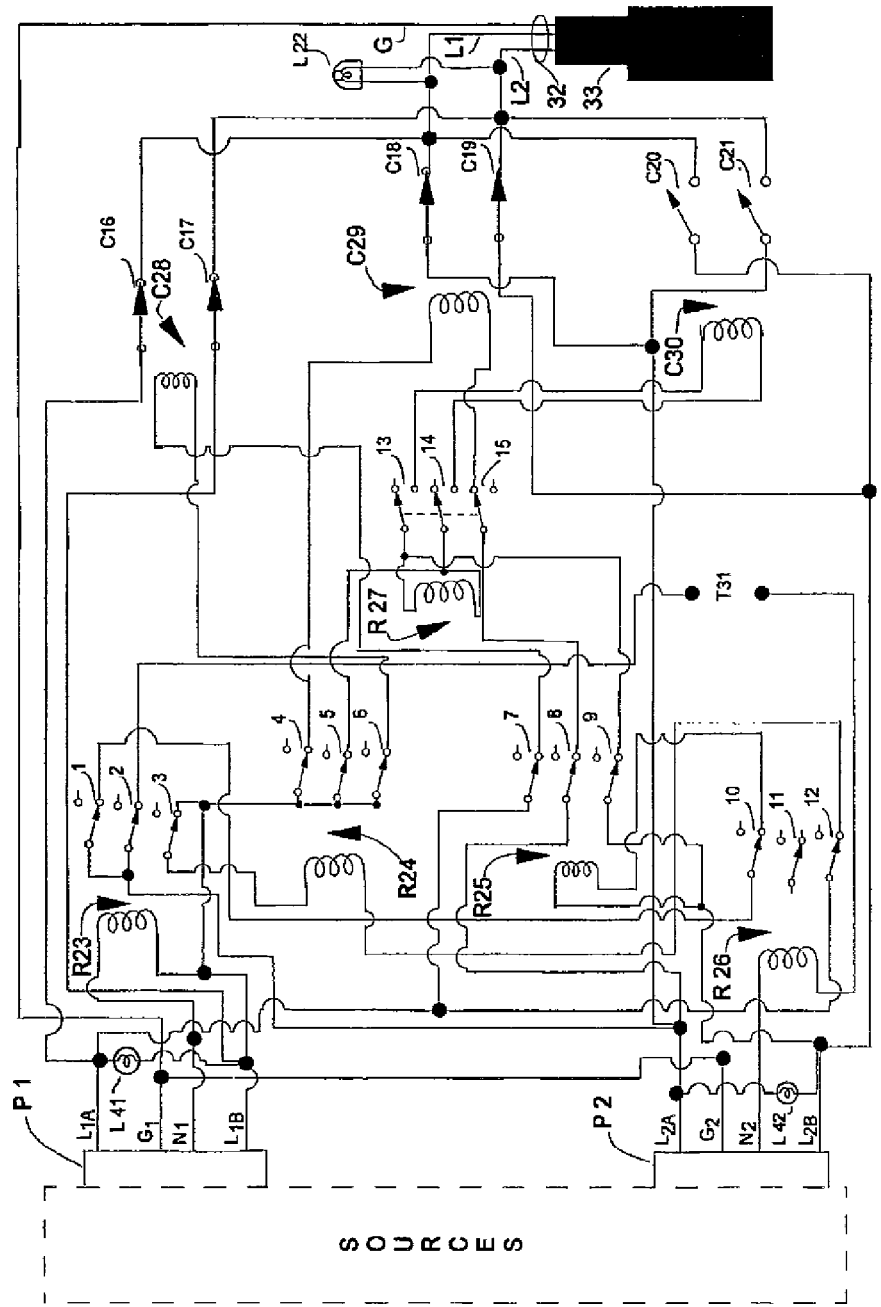
FIG. 4 is a schematic diagram of the circuitry of a preferred embodiment of the automatic power adapter and its internal electrical components, wherein both Plug No.1 (P1) and Plug No. 2 (P2) are inserted into a power source having polarities that are aligned.

FIG. 4 of the drawings illustrates the configuration wherein both plugs are inserted into a shore-based power source in preparation of supplying AC power to a marine vessel or other similar mobile load, appliance or the like. In this configuration the phases are aligned, and plug P1 is inserted first, followed by the insertion of plug P2.

When plug P1 is inserted into a receptacle or connector with two opposite pole 110-120 volt AC live lines, a neutral line, and a ground line, power will flow from line L1A, from line L1B to illuminate the 240 volt lamp L41 as described above. Power will also flow and be applied from line L1B of P1 to the 110-120 volt coil of relay R23 to the neutral line N1 of P1, completing the 110-120 volt circuit activating the relay R23 thereby closing the normally open contacts 1, 2, and 3. When plug P2 is then inserted into a matching power source receptacle or connector with two opposite pole 110-120 volt AC lives lines, a neutral line, and a ground line in which the phases are aligned with the first power source receptacle and plug P1, power will flow from line L2A to the closed contact 2 of relay R23 and thereafter on to a contact of timer T31, a delay on make timer, after a prescribed delay, for this component, power is in turn passed on to the 110-120 volt coil of relay R26, and to the neutral line N2 of plug P2. This completes the 110-200 volt circuit actuating the relay, R26 and closing the normally open contacts 10, 11, and 12. Power will now flow from line L2A to closed contact 1 of relay R23, and passing through the relay switch contact to closed contact 10 of relay R26, and on to the 240 volt coil of relay R25 and to line L2B of plug P2. Power applied to this relay activates R25 closing the normally open contacts 7, 8, and 9. Power applied to and through plug P1 line L1A will now flow through closed contact 12 in relay R26 to the 240 volt coil of relay R24, and in turn through closed contact 3 of relay R23 and to line L1B of plug P1. This activates relay R24 closing the normally open contacts 4, 5, and 6. Power from plug P1 line L1A will now flow through now closed contact 7 of relay R25 and will be further applied to the 240 volt coil of contactor C28 to now closed contact 6 of relay R24 and on to plug P1 line L1B, actuating the contactor, closing contacts C16 and C17.

In this circuit configuration, and with the voltage and currents applied and components enabled in this state, current can now pass from plug P1 line L1A through contact C16 in contactor C28 to the L1 terminal on receptacle 33, the high amperage output connector. At the same time, current can pass from plug, P1 line L1B through contact C17 of contactor C28 on to terminal L2 on receptacle 33. Simultaneously, source power will flow from plug P1 line L1B to now closed contact 4 of relay R24 to the 240 volt coil of contactor C29, to normally closed contact 15 of relay R27, to now closed contact 8 of relay R25 through to plug P2 line L2A, which actuates the contactor and closes contacts C18 and C19. Power will now pass from plug; P2 line L2A through contact C18 of contactor C29, and on to the line L1 terminal on receptacle 33, and from plug P2 line L2B to contact C19 of contactor C29, and on to line L2 terminal on the receptacle 33 connector, thereby supplying the amperage capabilities of the sum of plug P1 and plug P2 simultaneously to receptacle 33. The 240 volt indicator lamp L22, electrically attached to lines L1 and L2 will illuminate indicating that power is available at receptacle 33. The combined sum of the individual input power sources (and relatively high amperage) is now supplied and electrically connected to the marine craft, which can now be powered through the automatic power adapter.

Figure 5:
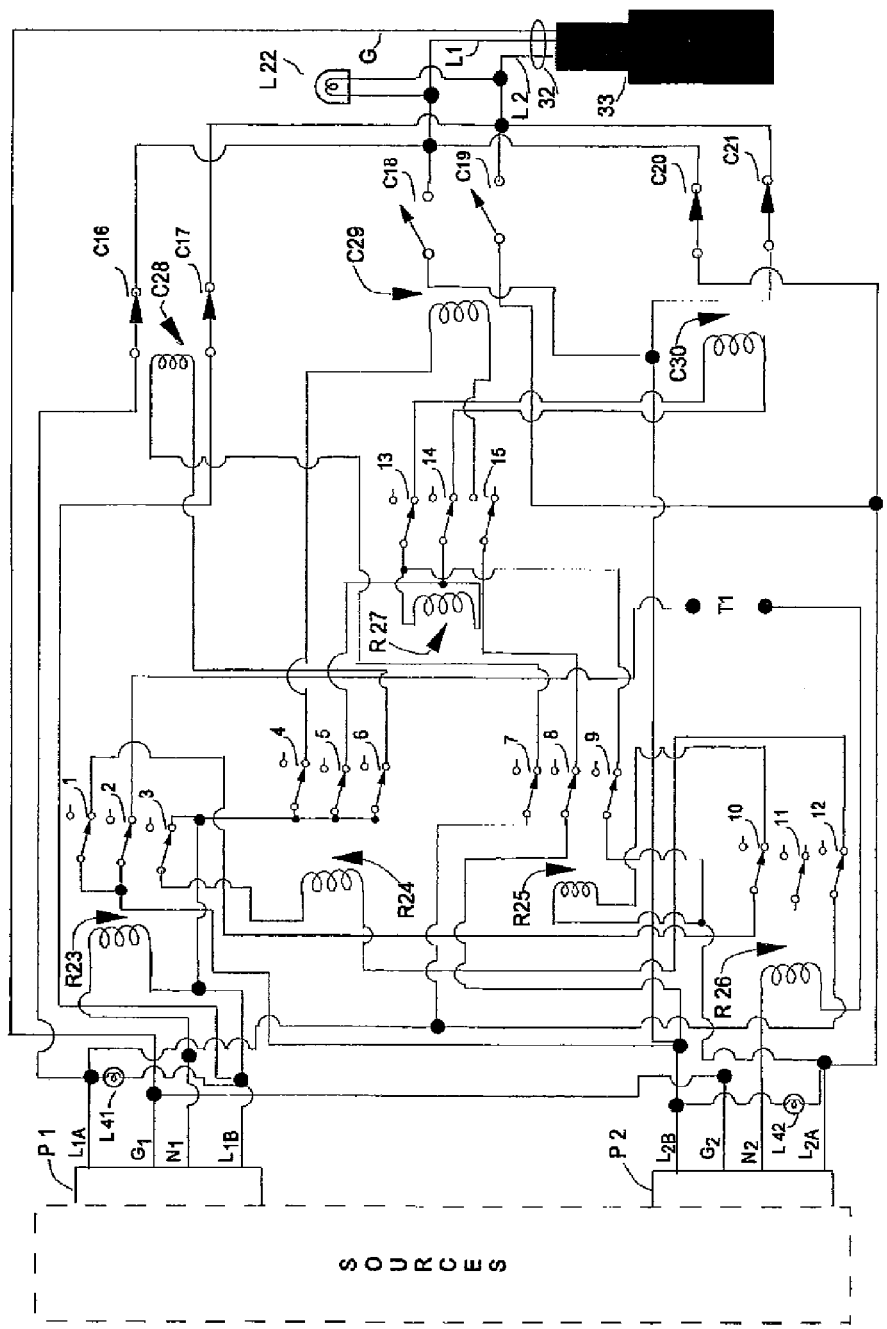
FIG. 5 is a schematic diagram of the circuitry of a preferred embodiment of the automatic power adapter and its internal electrical components wherein both Plug No.1 (P1) and Plug No. 2 (P2) are inserted into a power source having polarities that are not aligned.

FIG. 5 of the drawings illustrates the configuration wherein both plugs P1 and P2 are inserted into a shore-based power source in preparation of supplying AC power to a marine vessel or other load; however, in this configuration the phases are not properly aligned. Note that in contradistinction to FIG. 4, hot line inputs L2B and L2A of plug P2 have been reversed in position and electrical connection to the plug. The respective conductive blades have been switched which has created opposite pole live lines with respect to plug, P1 inputs.

When plug P1 is inserted into a receptacle or connector with two opposite pole 110-120 volt AC live lines, a neutral line, and a ground line, power will flow from line L1B to the 110-120 volt coil of relay R23 to the neutral line N1 plug P1 completing the 110-120 volt circuit activating the relay and closing the normally open contacts 1, 2, and 3. When plug P2 is inserted into a matching receptacle or connector with two opposite pole 110-120 volt AC live lines, a neutral line, and a ground line in which the phases are not aligned with the first receptacle plug P1, power will flow from line 2B to the now closed contact 2 in R23 and further on to timer T1, and after a prescribed delay, power is applied to the 110-120 volt coil of relay R26 and to the neutral line N2 of plug P2. This completes the 110-120 volt circuit activating relay R26, closing the normally open contacts 10, 11, and 12. Power will now flow from line L2B to closed contact 1 in R23 to closed contact 10 in relay R26, and through to the 240 volt coil of relay R25 to line L2A of P2, thus activating relay 12 and closing contacts 7, 8, and 9. Power from plug P1 line L1A will now flow through closed contact 12 of relay R26 to the 240 volt coil of relay R24, and through to closed contact 3 of relay R23 and on to line L1B of plug P1. This in turn activates relay R24 closing the normally open contacts 4, 5, and 6. Power from plug, P1 line L1A will now flow through closed contact 7 of relay R25, through to the 240 volt coil of contactor C28 and through the closed contact 6 of relay R24, and further on to plug P1 line L1B. This circuit condition actuates contactor C28, closing contacts C16 and C17. Power can now pass from plug P1 line L1A through contacts C16 in contactor C28 to the L1 terminal on receptacle 33 the high amperage connector; and from P1 line L1B through contact C17 in C28 on to terminal L2 on receptacle 33.

In this relative reversed wiring or mis-aligned phase status, power is also applied to the coil of relay 27, closing normally opened contacts 13 and 14. Note that contactor C29 in not energized and contacts C18 and C19 are opened. Power is applied to the coil of contactor C30, closing normally open contacts C20 and C21. Power can now pass from plug P2 line L2B through contactor C30 contact C21 to circuit a node line L2 of receptacle 33. Power also passes from plug P2 line L2A through contactor C30 contact C20 to circuit node line L1 of receptacle 33.

The 240 volt indicator lamp L22, attached to L1 and L2 lines will illuminate, indicating that power is available at receptacle 33 the voltage of 240 volts is applied and the summed current capacity of both plugs P1 and P2 is available at relatively high amperage, and that the craft can now be powered through the device.

Therefore, in comparison of the distinct phase alignment inputs and differing wiring configuration of the input power sources of FIGS. 4 and 5 the automatic adapter inherently compensates with the end result that irrespective of such configuration summed amperage is applied to the load. The adapter sensing the configuration, enables discrete circuit components through the network of relays and contactors, and selectively passes power through to the output receptacle through separate and independent sub-circuits. The operation is totally automatic, seamless to the user, and the operator is unaware of the inherent circuit compensation or corrections that have taken place.

Figure 6:
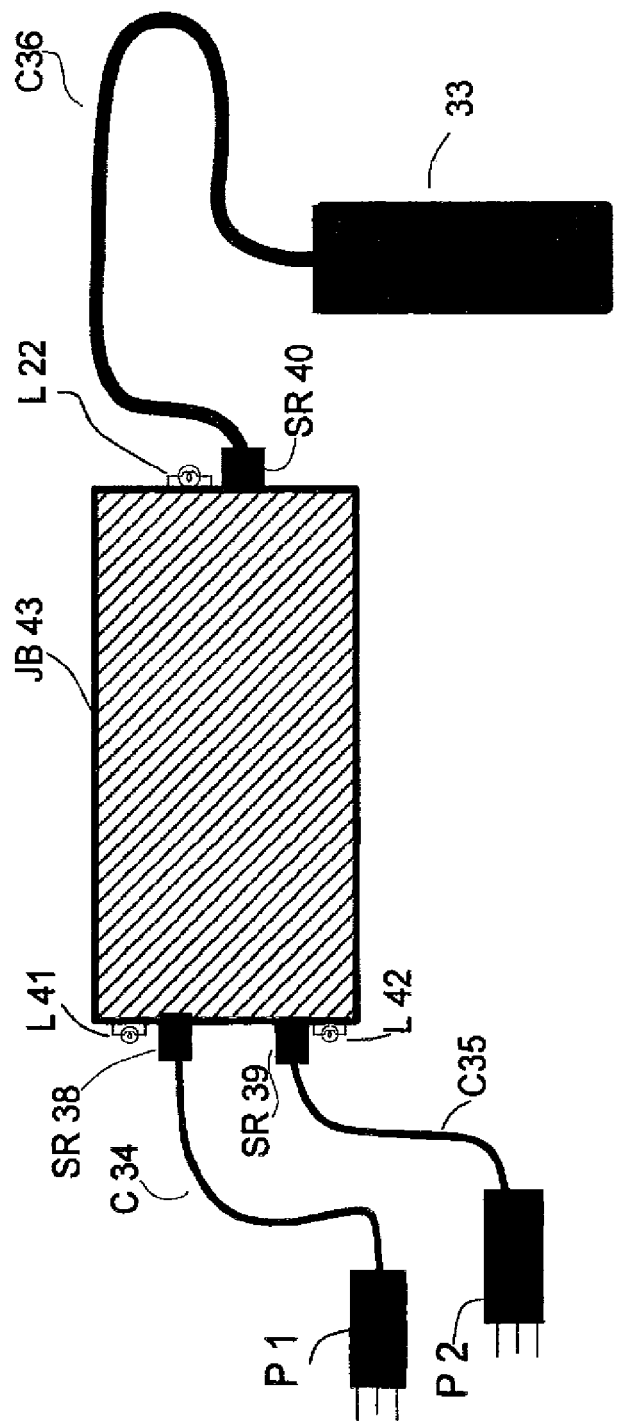
FIG. 6 is an external top plan view the instant automatic power adapter, Plugs and Receptacle.

FIG. 6 of the drawings depicts a top plan of the hardware and mechanical components of the automatic adapter. Male plugs P1 and P2 are illustrated, with power cords C34 and C35, respectively. Weatherproof strain relief; SR 38 SR 39 and SR 40 provide protection for the cable and wires feed to housing for the circuitry, electrical and mechanical components which include relays, contactors connectors hardware screws, nuts, bolts and conventional parts. The housing JB 43 is a preferably sealed and weatherproof enclosure large enough to house the internal components, which are meant for heavy duty applications, as will be appreciated by one ordinary skill in the industry.

The housing also includes indicator lamps L22, L41 and L42, as well as output power cord C36 and output receptacle connector 33.

In operation the instant invention provides a device with automatic phase sensing capabilities for multiple power inputs, and automatic phase aligning capabilities able to sense if the phases are aligned, and if unaligned to automatically align the phases internally through discrete, circuit components and sub-circuits. The device safely connects the two lower amperage capacity input circuits of the same or similar voltages, into a single higher amperage capacity output without significant voltage change, to equal approximately the sum of the two lower amperage capacity circuits, such as two 240 volt AC, 50 amp circuits into one 240 volt AC, 100 amp output circuit, automatically.

Alternatively, if the phases are aligned, the instant adapter safely connects the two aligned lower amperage capacity circuits of same or similar voltages into a single higher amperage capacity circuit, by sequentially connecting and activating multiple plug inputs to avoid shocks or burns and prevent power output until such time as both input plugs are secured and enabled.

This instant automatic adapter can use three or more contactors or one or more reversing, contactors, to automatically switch or align the phases to adapt two lower amperage capacity input circuits into a single higher amperage capacity output circuit equaling the approximate sum of the two lower amperage circuits.

The stated voltages and amperages discussed herein are used as examples only, and in no way limits the scope of the inventions to specific values. A mechanical or electrical lockout can be used an option with contactors C29 and C30 for extra protection against both C29 and C30 engaging at the same time.

The timer illustrated in the drawings requires only two wires. The device can be wired with several different types of timers for similar results, and many options are available.

The instant description, drawings and schematics illustrate to one of ordinary skill in the art, how to manufacture, assemble, utilize and practice the instant automatic power adapter designs for electrically connecting power sources and loads. This description is made by way of represented examples only, and it is recognized, however, that variations will occur to those skilled in the art, all of which are deemed to be within the scope of these inventions.

What is claimed is:

1. An automatic power adapter for use in electrically connecting a power source to a load, said automatic adapter including electrical circuits, and further comprising:

first plug means for receiving a first input from said power source;

second plug means for receiving a second input from said power source;

output connector means for providing voltage and current output to said load;

relay network means for automatically sensing the relative phase alignment of said first and second inputs from said power source;

contactor network means for selectively providing an output to said connector means, said contactor network means providing the sum of current amperage from said first and second inputs from said power source;

said relay network means and said contactor network means automatically detecting the phase relationship of said first and second inputs from said power source, whether said phase relationship is aligned or not aligned, and automatically compensating for and correcting said phase relationship when not aligned, and electrically connecting said first and second inputs to said output connector in proper phase alignment condition;

said automatic power adapter sensing said phase relationship of said first and second inputs and, depending upon said phase relationship, selectively enabling discrete circuit components, said discrete circuit components being separate, alternative and independent relays and contactors, to provide a desired output being the sum of current amperage from said power source inputs;

said automatic power adapter continuing to operate and provide said desired output of the sum of current amperage of said power source inputs in proper phase alignment condition irrespective and without regard to whether said phase relationship is initially synchronized or not synchronized and irrespective and without regard to any predetermined relationship of said phase relationship; and whereby said automatic power adapter provides said desired output of the sum of current amperage of said power source inputs in proper phase alignment condition, whether said phase relationship is initially aligned or not aligned.

2. The apparatus as set forth in claim 1, wherein:

said first plug means includes separate first and second live line conductors, a neutral line conductor and a ground conductor;

said second plug means includes separate first and second live line conductors, a neutral line conductor and a ground conductor; and said relay network means automatically sensing the relative phase alignment of each said first and second live line conductors of both said first and second plug means.

3. The apparatus as set forth in claim 1, wherein said relay network means further comprises:

a plurality of relays, each said relay including coil means for enabling said relay and switching means for selectively switching relay contacts from opened and closed positions.

4. The apparatus as set forth in claim 3, wherein said plurality of relays are electrically coupled to one another for selective enablement of discrete circuit paths and for selective enablement of said contactor network means.

5. The apparatus as set forth in claim 4, wherein said contactor network means further comprises a plurality of contactors, each said contactor including coil means for enabling said contactor and switching means for selectively switching contactor contacts from opened and closed positions;

said plurality of relays controlling the selective enablement of each said contactor;

said contactors selectively providing the sum of current amperage of said power source inputs, from separate and independent contactors depending upon said phase relationship, to said output connector means.

6. The apparatus as set forth in claim 1, wherein said contactor network means further comprises:

a plurality of contactors, each said contactor including coil means for enabling said contactor and switching means for selectively switching contactor contacts from opened and closed positions.

7. The apparatus as set forth in claim 1, further comprising:

indicator means for indicating the status of power being applied to either said first or second plug means.

8. The apparatus as set forth in claim 1, further comprising:

indicator means for indicating the status of power being applied to said output connector means.

9. The apparatus as set forth in claim 1, wherein said relay network means further prevents the enablement of said contactor network means from providing power to said output connector means if either said first or second plug means is disengaged from said power source.

10. An automatic power adapter for use in electrically connecting a power source to a load such as a marine vessel, said automatic adapter including electrical circuits and sensing the phase relationship and alignment of separate power inputs from said power source, said automatic adapter automatically internally compensating for said phase relationship and providing an output of the combined sum of the current amperage of each of said power inputs, and further comprising:

a first plug for receiving a first input from said power source;

a second plug for receiving a second input from said power source;

said first plug including separate first and second live line conductors, a neutral line conductor and a ground conductor;

said second plug including separate first and second live line conductors, a neutral line conductor and a ground conductor;

an output connector for providing voltage and current output to said load;

a relay network including a plurality of discrete relays for automatically sensing the relative phase relationship and alignment of said first and second inputs from said power source;

each said relay including coil means for enabling said relay and switching means for selectively switching said relay contacts from opened and closed positions;

a contactor network including a plurality of discrete contactors for selectively providing power to said output connector, said contactor network providing the sum of current amperage from said first and second inputs from said power source;

said plurality of relays being electrically coupled to one another for selective enablement of discrete circuit paths and for selective enablement of said contactor network;

said relay network and said contactor network automatically detecting the phase relationship of said live line conductors and inputs from said power source, whether said phase relationship is aligned or not aligned, and automatically compensating and electrically connecting said first and second inputs through discrete circuits to said output connector in proper phase alignment condition;

said automatic power adapter continuing to operate and provide said desired output of the sum of current amperage of said power source inputs in proper phase alignment condition irrespective and without regard to whether said phase relationship is initially synchronized or not synchronized and irrespective and without regard to any predetermined relationship of said phase relationship; and wherein said automatic power adapter senses and automatically adjusts internally to compensate for, and correct, live line phase misalignments and selecting the appropriate internal circuit to provide a pass through voltage and summed current amperage to a load without disabling the adapter or requiring the use of additional equipment or re-wiring of the power source.

11. The apparatus of claim 10, further comprising:

a plurality of indicators to indicate the status and application of power to each of said first plug, second plug and output connector.

12. The apparatus of claim 10, further comprising:

means for preventing the enablement of said contactor network from providing power to said output connector if either of said first or second plugs is disengaged from said power source.

13. The apparatus of claim 10, further comprising:

timer means for preventing the simultaneous application of power from said first and second plugs to said relay.

* * * * *

UNITED STATES PATENT AND TRADEMARK OFFICE
CERTIFICATE OF CORRECTION

PATENT NO.         : 7,528,504 B2  
APPLICATION NO. : 11/870880  
DATED                   : May 5, 2009  
INVENTOR(S)         : Lewis Gerber It is certified that error appears in the above-identified patent and that said Letters Patent is hereby corrected as shown below:

Column 1, line 24:
"polymer" should be "power"

Column 3, line 24:
"maine" should be "marine"

Signed and Sealed this

Twenty-third Day of June, 2009

JOHN DOLL
*Acting Director of the United States Patent and Trademark Office*